Dec. 7, 1954 C. O. BALL 2,696,440
PROCESS OF PREPARING A JUICE PRODUCT FROM FRUIT
AND VEGETABLES, MORE ESPECIALLY PINEAPPLE
Filed July 13, 1950 2 Sheets-Sheet 2

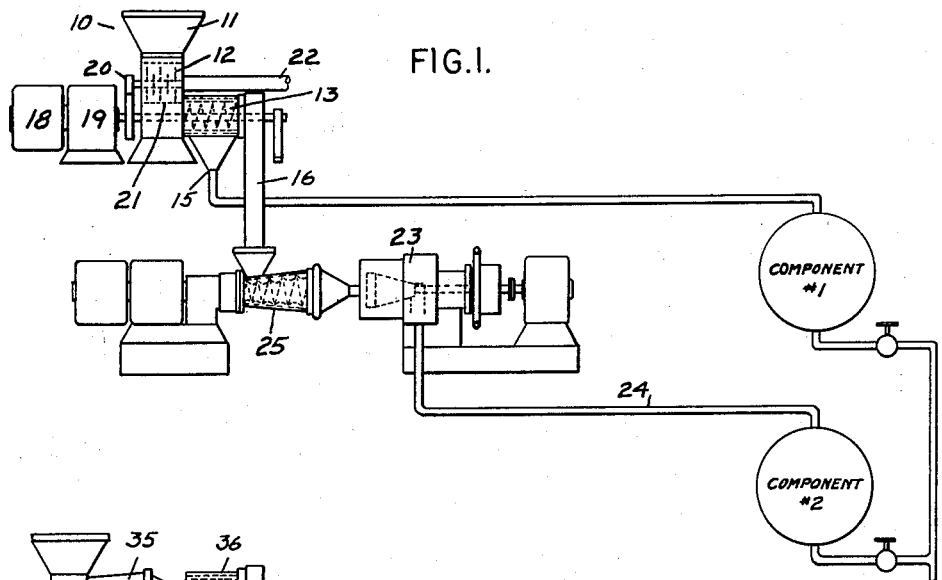
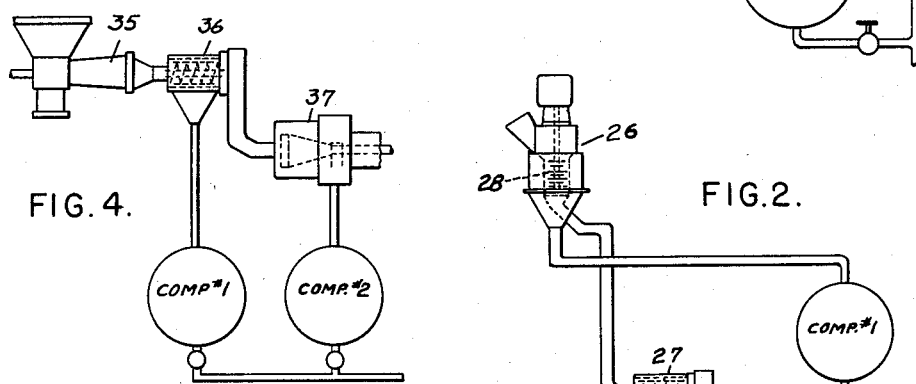
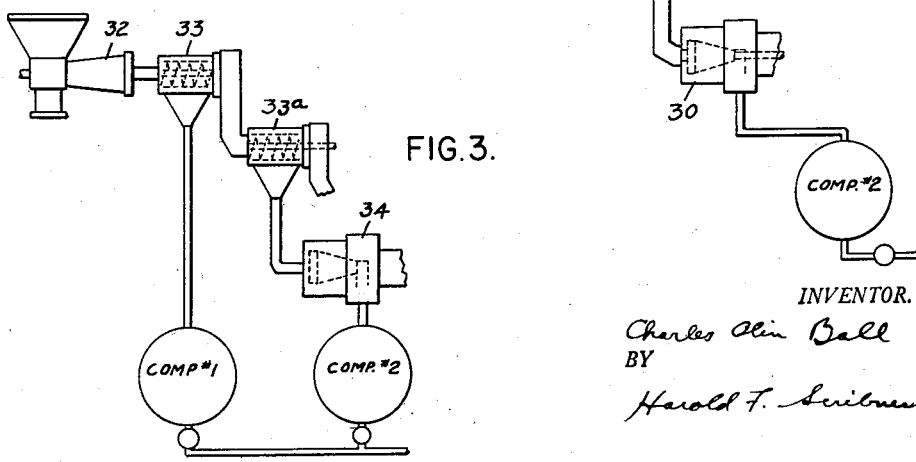

INVENTOR.
Charles Olin Ball
BY
Harold F. Scribner

2,696,440

PROCESS OF PREPARING A JUICE PRODUCT FROM FRUIT AND VEGETABLES, MORE ESPECIALLY PINEAPPLE

Charles Olin Ball, New Brunswick, N. J., assignor to Chemicolloid Laboratories, Inc., New York, N. Y., a corporation of New York Application July 13, 1950, Serial No. 173,651

16 Claims. (Cl. 99—105)

The present invention concerns a process of preparing a palatable nutritious juice from fruits and vegetables which possess, as constituent parts, tough fibrous tissue and other insoluble solids either in the skin or fleshy portions, and wherein and whereby a substantial portion or all of the fibrous tissue and other insoluble solid substance are retained and caused to remain in uniform distribution throughout the body of the juice product for relatively long periods of time when held in a container undisturbed by agitation.

For convenience in setting forth the essential features of the invention, the process will be exemplified more particularly in connection with the preparation of a juice product made from pineapple fruit for it is well known that pineapples contain a large proportion of tough fibrous tissue and other insoluble solid substance which tend, with the prior methods of processing, normally to settle out. The invention is, however, applicable to other fruits and vegetables containing juice, fiber, and other insoluble solids, as will hereafter become evident.

For reasons of flavor, nutritive value, and of desirability in other organoleptic aspects, the consuming public generally prefers a juice which not only is smooth in apperance and bright in color, but which also contains a quantity of the insoluble solid portions of the fruit and a primary aim of the invention is to prepare a juice containing a substantial portion of the insoluble fruit solids, including fiber and, at times, seeds, not in a form or state in which they quickly settle out or in which severe agitation is required to obtain a reasonably uniform mix, but in a state such that the fiber and other insoluble solids remain in uniform distribution throughout the body of the juice for comparatively long periods of time.

A further object of the invention is to prepare a juice product from tough skinned or "woody" fruits and vegetables which contain fibrous tissue which presents a smooth appearance and a pleasing bright color.

A further object of the invention is to prepare a juice product in which maximum benefit is obtained from proper processing and use of the antioxidant and stabilizing factors which are normal components of the fibrous portions of fruits and vegetables.

It has been generally believed that if the solid material of a fruit or vegetable is divided into very small particles, such insoluble solids will remain in suspension. I have found, however, that the physical subdivision of the solid material into minute particles will not alone enable the solids to remain in suspension, and I have also discovered what I believe to be the necessary additional requirements, along with fine subdivision of the insoluble solid material, for producing a juice of outstanding quality from a fruit or vegetable containing fibrous tissue.

Among the additional requirements found to be critical in the preparation of a juice having the above described desirable qualities is (1) the processing of the tough fibrous tissue so as to present the tissue as individual filaments of fiber, each of a thickness within the range of from .003 cm. (3 microns) to .0008 cm. (8 microns), but preferably .0004 cm. (4 microns) and generally of a length of at least .01 cm. (100 microns) and simultaneously forming these filaments into a crinkly conformation so that they appear in a microscope as a matted spongy mass of entangled filaments; and (2) forming the non-fibrous portion of the solids into a partially homogenized material of smooth texture consisting of a blended mass of colloidal substance of comparatively low viscosity and a jelly-like pectinous substance of higher viscosity. When the constituent (2) above is interspersed among the crinkly fibrous filaments, the latter appear as held loosely in their crinkly conformation and kept entangled in a matted formation of spongy texture and, in this form, tend to remain in suspension in the main body of the liquid for a considerable period of time. Some of these filaments may be even longer than .5 cm. (5000 microns).

In contrast to the product produced by this process, a juice has heretofore been produced in which the fibrous tissue is broken into filaments approximately .0005 cm. (5 microns) thick and generally less than .01 cm. (100 microns) long and in which the non-fibrous substance is disintegrated into individual cell-like structures of granular nature. In such a product, the relatively thick and short fibrous filaments are neither interlocked nor bound together by the non-fibrous pectinous material, but the granular cell-like structures of the latter are dispersed individually in the liquid and rapidly settle, assuming a coagulated muddy appearance. Such precipitated solids appear dark in color and unattractive as compared to the solids in a juice prepared by the process of this invention, which is bright in color in consequence of the improved light refractive and reflective effects inherent in a homogeneous mass of long, crinkled, filamentary tissue held in suspension as a formation of spongy texture, containing entangled crinkled filaments.

In carrying out the objectives of this invention, it is proposed to process the fruits or vegetables in such a manner as to produce two components which later are mixed to form the final product, supplemented, if desired, with a third component, to wit, a seasoning which may be sugar, salt, or other substance, or a combination of two or more such substances, depending upon the character of the raw material. Using for this exemplification, the fruit pineapple, the first component is a juice which is expressed from the pineapple flesh and/or cores in a manner such that the juice contains only a small amount of precipitable solids. The second component is prepared from the tough fibrous tissue and liquid and in its prepared state, is a liquiform product, a puree-like material. This second component is produced by shredding the naturally occurring fibrous bundles in a manner hereinafter described into entangled masses of fine filaments having the characteristics and size above mentioned and by imparting to the non-fibrous insoluble solid material a smooth tex ture and a property which enables this material to give increased viscosity to the liquid containing it. This thickening property, resulting from the mechanical treatment used, comes, in major part, from the effect of the mechanical treatment in increasing the coefficient of solubility of the pectinous substance which is a natural ingredient of the insoluble parts of fruits and vegetables. This conversion of pectinous substance has an effect similar to that which comes from the conversion of pectins into pectic acid by hydrolysis or by pectinase treatment of pectins. The occurrence of this conversion of pectinous substance in intimate association with the breaking up of fibers into filaments of microscopic thickness is an important feature in obtaining the coveted results in this process. In this second component, the masses of fine filaments appear in a microscope as bonded together by a jelly-like pectinous material of heavy consistency.

The expression "small amount of precipitable solids" as herein used is intended to mean that the amount of insoluble solids contained in the component is not greater than 10 percent and preferably not greater than 2½ percent. The total amount of solids, in the case of pineapple, is of the order of from 6 to 18 percent, measured on a dry basis. The percentage of total solids will vary with different fruits and vegetables, depending upon the amount of sugar and other soluble solids in the flesh, cores, or in skin, from which the juice is expressed. The value indicated for insoluble solids is determined by centrifuging the juice in the manner described in the "Text of proposed FSA standards for canned pineapple and canned pineapple juice," section 5, paragraph b4, which is published in the Federal Register, August 6, 1949, Doc. No. FDC 56.

"(4) Measure 50 ml. of pineapple juice into a long cone-shaped graduated centrifuge tube measuring approximately 4 3/16 inches from tip to top calibration, and having a capacity of 50 ml. Place tube in suitable centrifuge, the approximate speed of which is related to diameter of swing in accordance with the table immediately below. The word "diameter" means the over-all distance between the tips of opposing centrifuge tubes in operating position.

| Diameter: | Approximate revolutions per minute |
|---|---|
| 10 inches | 1,609 |
| 10½ inches | 1,570 |
| 11 inches | 1,534 |
| 11½ inches | 1,500 |
| 12 inches | 1,468 |
| 12½ inches | 1,438 |
| 13 inches | 1,410 |
| 13½ inches | 1,384 |
| 14 inches | 1,359 |
| 14½ inches | 1,336 |
| 15 inches | 1,313 |
| 15½ inches | 1,292 |
| 16 inches | 1,271 |
| 16½ inches | 1,252 |
| 17 inches | 1,234 |
| 17½ inches | 1,216 |
| 18 inches | 1,199 |
| 18½ inches | 1,182 |
| 19 inches | 1,167 |
| 19½ inches | 1,152 |
| 20 inches | 1,137 |

After centrifuging exactly 3 minutes, the milliliter reading at the top of the layer of insoluble solids is multiplied by 2 to obtain the percent insoluble solids."

Other objects and advantages will be in part indicated in the following description and in part rendered apparent therefrom in connection with the annexed drawings.

To enable others skilled in the art so fully to comprehend the underlying features hereof that they may practise the process in the various ways contemplated by this invention, drawings depicting typical flow charts have been annexed as a part of this disclosure of which:

Figure 1 of the drawings is a diagrammatic illustration of apparatus useful in preparing a juice containing a substantial portion of fibrous tissue and other insoluble solids and wherein it may be found desirable to remove the very coarsest of the fiber before processing the remaining fibrous tissue.

Fig. 2 of the drawings is a diagrammatic view similar to Fig. 1, illustrating a variant form and arrangement of apparatus that may be employed in preparing the juice components.

Fig. 3 illustrates another form and arrangement of apparatus that may be utilized in preparing the juice components and with which the coarsest fiber receives a partial treatment before being discarded and the processing carried further with the bulk but less coarse fibrous material.

Fig. 4 is a diagrammatic representation of apparatus useful in preparing a juice product in which all of the tough fibrous tissue is utilized.

Figure 6:
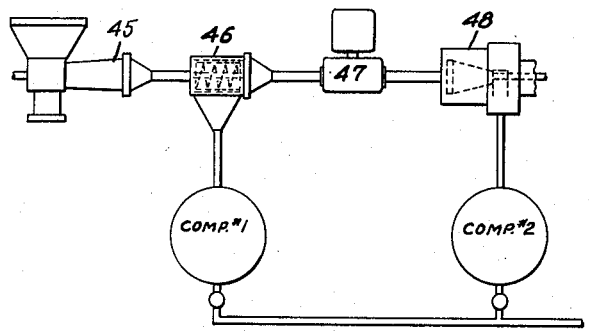
Figs. 5 and 6 illustrate variant forms and arrangements of apparatus that may be employed in preparing a juice product from fruits or vegetables containing fibrous tissue and insoluble solids according to procedures that involve the processing of all of the tough fiber.

As hereinafter indicated, one method of preparing a juice product from fruits and vegetables in accordance with this invention comprises essentially a macerating step during which a portion of the juice contained in the raw material is released and collected apart from the pulpy fibrous material, which latter material is further processed with the objectives firstly, to shred the bundles of tough fiber into individual crinkled filamentary elements, secondly, to release therefrom, a heavy-bodied serum-like pectinous material in non-granular form, and thirdly, to simultaneously bond the individual fiber filaments together with such serum-like material, to form a component of puree-like consistency, and collecting it apart from the juice, and the further step of mixing the juice and the fiber puree together in proper proportions and adding a seasoning, if desired, to form the final juice product. The viscosity of the final juice product is naturally increased as a result of the increase in thickening property which is produced in the pectinous component of the product; nevertheless, a high increase in viscosity is not always necessary in order to realize the benefits of this process. The desirable viscosity for the final juice product can best be indicated by comparison with the viscosity of the juice herein designated as component 1, which contains not more than 10 percent of insoluble solids as determined by centrifuging the juice, and which has not been subjected to a mechanical treatment such as that which is used to condition the material designated as component 2 for use in the formulation of the final product. The apparent viscosity, expressed in centipoises, usually preferred in the final juice product is from 1.75 to 4 times the apparent viscosity of component 1, although a final juice product regarded as satisfactory may have apparent viscosity from 1.4 to 9 times the apparent viscosity of component 1, depending upon the nature of the product. The apparent viscosity usually preferred in component 1 before seasoning is from 4 to 10 centipoises at 70° F. (21° C.), although the permissible range is somewhat wider than this, for example, from 2 to 12 centipoises. One may, if desired, utilize substantially the entire fruit or vegetable, pits and hard seeds generally excepted, and process all of the fiber or discard the very coarsest fibrous pieces and/or seeds and process the rest. According to one procedure, the invention may be successfully practiced with apparatus of the character indicated in Fig. 1, which for the main part, are commercial items on the market today.

Where it is desired to remove the coarsest fiber before further processing the main bulk of the flesh and core material, use is advantageously made of a hammer mill indicated at 10 having a feed hopper 11, cutting knives 12, and from which the primary effluent discharges directly to a screw conveyor press type of extractor 13. The extractor 13 should be equipped with a conduit 15 for the expressed juice which is conveyed by gravity or other suitable means to a storage tank marked "Component 1." The extractor 13 is also equipped with a second discharge conduit 16 for the bulk of the chopped flesh and core material of the fruit being processed, that passes the screen of the hammer mill 10. The mill 10 and press 13 may be driven by any suitable means such as a motor 18, reduction gearing 19, and transmission gear indicated at 20. Such a mill may be one which is sold under the name Reitz, and embodies a fairly coarse screen 21 (having approximately 3/16" to 1/4" holes) so that the primary effluent led to the press 31 is crushed material e. g., pineapple, and the secondary effluent, almost solely coarse fiber, is discharged through the conduit 22 and is discarded. The screen of the press should be quite fine (openings .015" to .060") so as to allow no coarse fiber to pass through.

The secondary effluent from the press, coarse fiber and solids, may be fed directly to the final triturating machine indicated at 23, or via a chopper 25 installed in the line 16. I have found that a machine known as the Charlotte Colloid Mill to be quite satisfactory for the purpose for such machines receive the coarse fiber and solids (moistened if necessary by the addition of liquid from component 1) and shred and disintegrate the fiber into a fruit-puree containing predominantly filaments of the desired size (.0005 cm. in thickness and .025 cm. in length) and jelly-like pectinous substance of smooth texture, all suspended in varying proportions of thin liquid. The effluent material from the colloid mill consisting of fiber filaments saturated with non-fibrous solids is passed to another storage tank marked "component 2" through the line indicated 24. The juice from the press, component #1, and the puree from the final triturating machine, component #2, and the sugar and/or salt component #3 are mixed in proper proportions to produce a palatable juice containing the proper percentage of solids and of proper sweetness.

Should the final triturating machine 23 lack capacity to handle the material fed to it by gravity from the press 13, its capacity may be increased by directing the coarse fiber and solids from the press to a chopper 25 inserted in the line 16 between the press 13 and triturating machine 23. The addition of the chopper in the system does not alter the process of preparing juice according to this invention, but is a mechanical expedient to which resort may be had to increase the output of the triturating machine. When so used the chopper performs the further function of a feeder for the triturating machine and the material is fed under pressure.

Deaeration steps, known in the food packing industry, may be included at appropriate points.

Another procedure that may be followed in removing the coarsest fiber before feeding the material to the final triturating machine is one similar in the essential steps to the procedure above described. Fig. 2 is illustrative of the variant procedure. In this figure the hammer mill 26 is indicated as being of the vertical type and the secondary effluent therefrom is run through a continuous press 27 with a screen having openings .1875" to .25" in size. The hammer mill screen 28 through which passes the primary effluent (the juice) must be quite fine and the press screen 29 must have rather large openings 3/16" to 1/4" so that all except coarse fiber issues as the primary effluent. The primary effluent from the press, fiber and solids, is then run through the final triturating machine 30 to produce the puree-like component #2. The coarsest fiber is discharged from the press through the channel 31 as waste.

Another procedure for removing the coarsest fiber is illustrated in Fig. 3, and consists in disintegrating the raw product i. e., pineapple flesh and/or cores by feeding the stock through a food chopper 32 having plate openings 1/8" to 3/8" in size and thence directly to a press 33 having screen openings .015" to .060" in size. The primary discharge from the press is collected and held to be used as component #1 of the final product. To this juice may be added filtered or strained juice derived from preliminary steps in the preparations of pineapple for canning, as slices, chunks or tidbits. The secondary effluent from the press 33 (the solids) is then passed through another press or extractor 33a having screen openings .12" to .25" in size. The primary effluent from the second press 33a consists of fiber tissues and solids and is fed to the final triturating machine 34, and the secondary effluent, which consists predominately of the coarsest fiber is discarded.

In all procedures, the material fed to the final triturating machine should be sufficiently moist for efficient handling by the latter. If the material is not moist enough, liquid from component #1 may be added.

According to another procedure the apparatus indicated in Fig. 4 may be arranged to produce a juice product with all of the fiber retained, and may consist of a chopper 35, a press 36, such as distributed under the name "American Utensil," "Chisholm-Ryder," "Sprague-Sells," or "Enterprise," and the final triturating machine 37. The chopper 35 should have plate openings 1/8" to 3/8" in diameter so as to permit all portions of the food to pass through and the press have screen openings .015" to .060" in diameter so that only solids which are suitable for the final product will pass through with the juice. In carrying out this procedure, the fruit or vegetable is disintegrated by passing it through the chopper and thence directly to the press. The expressed juice containing fine solids is collected and held as the vehicle component #1 for the final product. The secondary effluent from the press is fed directly to the final triturating machine where it is further disintegrated into a puree-like material containing many loosely entangled fiber filaments approximately .0005 cm. in thickness and .025 cm. in length through which a serum-like pectinous material produced during the final shredding is interspersed. It is my belief that the serum-like fluid helps to hold the crinkled fiber filaments loosely entangled, and they in turn help to hold the serum-like material within its meshes. But whatever may occur, the masses of long fiber filaments are by this method of processing, given buoyancy and a property of suspension when subsequently added in proper proportions to the juice, component #1, with seasoning added if desired.

Figures 5, 7:
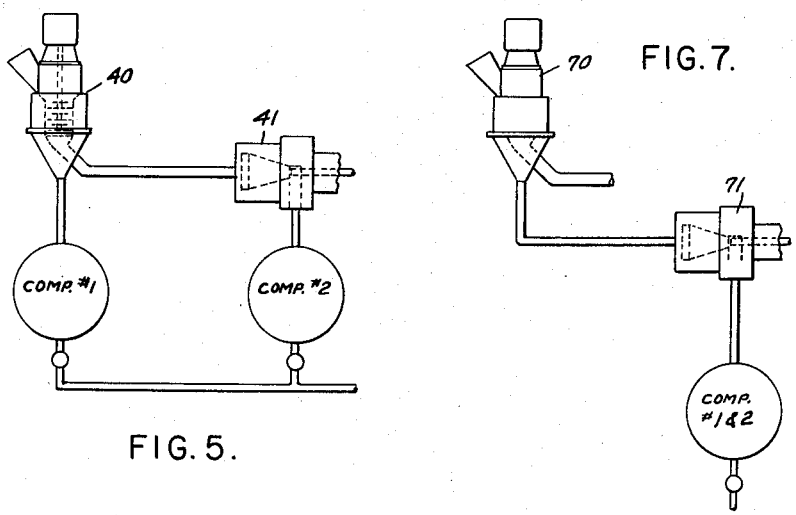
Fig. 7 illustrates a variant form and arrangement of apparatus that may be employed in preparing a juice product from fruits or vegetables containing fibrous tissue and insoluble solids according to a procedure in which the coarsest fiber receives a partial process before being discarded.

Figs. 5 and 6 illustrate diagrammatically variant processes for using the entire fruit or vegetable. The procedure followed, with the Fig. 5 apparatus or equivalent means, is to disintegrate the fruit or vegetable by putting it through a hammer mill 40 having a fine screen, with openings on the order of .015" to .060", to deliver juice in which the solids are in a fine state suitable for the final product. The primary discharge from the hammer mill is the juice which is collected and held as component #1. The secondary discharge from the hammer mill consists primarily of disintegrated fruit or vegetable fibrous stock and is fed directly into the final triturating machine 41 and further disintegrated into a puree containing masses of fiber filaments held together by and holding in its mesh the non-granular pectinous liquiform substance that is produced by this method of treatment. The secondary effluent from the hammer mill should be sufficiently moist to permit its being fed to the final triturating machine, and, to render it acceptable, liquid from component #1 may be added. The discharge from the final triturating machine, the puree-like material, is collected and held as component #2. Components #1 and #2 may later be mixed in proper proportions with such seasoning as may be desired, to produce the final product. In the procedure exemplified by Fig. 6, the raw product is macerated in a food chopper 45 having plate openings large enough to pass all of the ground stock, which is fed with the juice to a press 46. The press is equipped with a fine screen (.015" to .060" openings) and its primary effluent is juice and solids in a state suitable for the final juice product. The juice is collected and held as component #1. The secondary effluent from the press consists primarily of coarse fiber tissue and which is fed directly to the final triturator 48 through the intermediary of pressure applying means such as a pump 47. The application of a moderate pressure on the material being fed to the final triturating machine seems to increase the capacity of the latter, but the pressure should not be so great as to choke the triturating machine. The discharge from the triturating machine, the puree-like material is collected and forms component #2 of the juice product. Components #1 and #2 and seasoning if desired, may be then mixed in proper proportions to make the final juice product.

In all of the procedures above outlined the macerated and partially disintegrated fibrous tissue should be fed to the final triturating machine in a moist condition, for it seems not only is the moisture helpful as a vehicle and lubricant between the stator and rotor elements of the final triturating machine, but that the presence of some liquid aids in the formation or production of the serum-like and buoyancy giving products that are produced when the fibrous tissue is shredded into filaments of the size and character herein indicated. It also appears essential to the production of a non-settling juice product of the finest appearance that the fiber filaments be crinkled, filamentary, relatively long and fine and a colloid mill, such as the "Charlotte" tends to shred the fiber bundles in the manner desired for this product.

The final triturating machine must be of a type which exerts both a cutting and a shearing action upon solids passing between a rotor and a stator, operating with a uniformly held clearance of from .0005" to .015", preferably from .001" to .005". The opposing surfaces of the rotor and the stator are grooved with sharp edges which function as cutting edges. The action of such a machine is to split coarse fibers into filaments, which become crinkled and loosely entangled amongst each other, and to process pectinous substance in such a manner as to cause an increase in viscosity of the substance while retaining therein a smooth texture. The less the clearance between the rotor and the stator of the triturating machine, the more efficient is the processing of the fiber and the pectinous substance; also, within the limits studied, the more prolonged the action of the triturating machine on the product, the more efficient is the processing of the fiber and the pectinous substance. Furthermore, trituration of the fibrous and pectinous solids to the desirable state which has been described can be best accomplished at a high rate when the solids are processed in concentrated form such as will give in the effluent from the final triturating machine a solids content, determined by the centrifuge method, of between 25 and 100 percent and preferably between 50 and 100 percent. If a final juice is desired which contains as high a percentage of insoluble solids, determined by the centrifuge method, as is contained by the effluent from the final triturating machine, it obviously is not necessary to mix this effluent with juice of component #1, having not over 10 percent and preferably not over 2½ percent of insoluble solids, determined by the centrifuge method. In such case, when the original raw material, from which the juice is to be made, has the proper insoluble solids content, the extraction step may sometimes be omitted from the procedure of preparing the juice. Fig. 7 illustrates an apparatus arranged to carry out this variation, and which includes a hammer mill 70 with screen having holes 3/16" to 1/4" in diameter, and the final triturating machine 71. The secondary effluent from the hammer mill consists almost wholly of the coarsest fiber and is discarded. The primary effluent from the hammer mill is crushed pineapple and goes directly to the final triturating machine 71.

To increase the capacity of the equipment and to accentuate the desirable action on fiber and pectinous substance, more than one triturating machine may be operated in tandem.

It has been found that, with certain fruits and vegetables, a mechanical treatment such as that which is used to condition the material designated as component #2 for use in the formulation of the final juice product produces some alteration in flavor in the material. In some cases, the alteration may be regarded as favorable, for example, when the development of bitterness in juice containing the marc of certain citrus fruits is reduced in intensity by the mechanical treatment; in other cases, however, the alteration produced may be considered undesirable. When the latter condition exists, it is, of course, advantageous to subject to the mechanical treatment as small a portion as possible of the components from which the final juice product will be formulated so that a large proportion of the final juice product will not have been subjected to the final triturating treatment.

It is sometimes permissible to have in the final juice product some partially separated fiber filaments, which filaments are held in essentially parallel relationship to each other in comparatively loosely knit bundles having various lengths from .02 cm. (200 microns) to .5 cm. (5000 microns). Such clumps of fibrous materials are visible individually without the aid of a microscope. If such loosely knit bundles of fiber filaments are present in the effluent (component 2) from the final triturating machine and it is not desired to have these clumps of filaments in the final juice product, they may be removed by straining either component 2 or the final juice product through a screen of from 10- to 16-mesh size. The size of the screen openings employed depends upon the degree of removal of partially disintegrated bundles of filaments which is desired. A 14-mesh screen gives results which are usually considered satisfactory.

It has already been indicated that the desirable effect of producing insoluble fiber solids and pectinous substance in the juice product in such a state that these solids remain in uniform distribution throughout the body of the juice for extended periods of time is increased by either reducing the clearance between the rotor and the stator of the final triturating machine or by prolonging the action of the final triturating machine on the solids for the juice product. It has also been pointed out that best results are obtained when the concentration of insoluble solids in the material treated in the final triturating machine is greater than 25 percent, as determined by the centrifuge test. A fourth means of accentuating this desirable condition in the final juice product is to increase the percentage of the mixture of processed pectinous and fiber solids in the final juice product.

An example will be given to illustrate the effects of three of the factors mentioned above in prolonging the time required for the insoluble solids to settle in the final pineapple juice product. Three types of juice, as distinguished by the conditions of processing in the final triturating machine and one type of juice prepared by a different process are included in the example. These types are the following:

K1—Processed by a method which produces in the insoluble solids the characteristics which have been described as being undesirable.

J4—Processed with a clearance of approximately .007" between rotor and stator of the triturating machine for a time which may be designated as $t$ seconds.

J2—Processed with a clearance of approximately .001" between rotor and stator of the triturating machine for a time of $t$ seconds.

J3—Processed with a clearance of approximately .001" between rotor and stator of the triturating machine for $2t$ seconds.

In the preparation of types J4, J2, and J3, the processed solids were mixed in varying proportions with thin liquid (component 1) to give final juice products having varying percentages of insoluble solids, as determined by the centrifuge method. The rates of settling of the insoluble solids in undisturbed juice of types J4, J2, J3, and K1, in cylindrical glass vials were observed and data recorded on the rate at which insoluble solids settled in the juice by noting the receding vertical thickness of the layer of visible solids in the juice. In Table 1 is given the length of time required for the solids in each vial to settle to a volume which equals 95 percent of of the total volume of juice in the vial.

TABLE

*Rates of settling in pineapple juice prepared by different procedures*

(Solids by settling equals 95 percent of total volume)

| Solids by Centrifuge Method (percent) | Length of Settling Period (hours) | | | |
|---|---|---|---|---|
| | J3 | J2 | J4 | K1 |
| 20 | .24 | | | |
| 25 | .51 | .185 | | .06 |
| 30 | .96 | .38 | | |
| 35 | 1.65 | .70 | .115 | |
| 40 | 2.60 | 1.18 | .232 | |
| 50 | 5.60 | 2.90 | .75 | |
| 60 | 10.50 | 6.00 | 2.00 | |
| 70 | | 11.00 | 4.50 | |

By way of further illustration of the application of this process, a procedure for producing grapefruit juice concentrate will be described to indicate the manner in which insoluble solids may be separated from a major part of the juice and then be mechanically treated to condition it for the final juice product. The following procedure may be used:

Bisect the fruit in a plane perpendicular to the planes of the sectional divisions.

Cut out the core, in which all seeds are contained, from each half of fruit. Regardless of whether the fruit contains many or few seeds, a core having a diameter of from 30 to 40 percent of the diameter of the fruit is removed in such a way as not to remove any rind at the end of the core. After removal of the cores, juice is extracted from the fruit halves by any satisfactory procedure. The juice is strained through a screen having openings of such size as is suitable for the type of final juice product which it is desired to produce. Suitable openings may be from .04" to .06" in size. This juice constitutes the major part of component 1. If any pulp solids are strained from the juice, they are incorporated into the material from which component 2 is formed.

The cores are put through a press having a screen with openings varying from .10" to .20" in size, from which the primary effluent is juice which is later remixed with the fibrous tissue constituting a portion of the secondary effluent of the press to form the material from which component 2 will be prepared. The secondary effluent of the press, consisting mainly of seeds and fibrous tissue, is subjected to a treatment by means of which the seeds are detached and separated from the fibrous tissue, or marc. The seeds are discarded and the fibrous tissue is collected as the basic part of the material from which component 2 will be prepared. This fibrous tissue is put through a food chopper with plate openings of the smallest practicable size, such as between .08" and .16". The primary effluent from the press, with any pulp solids which are strained from component 1 and the fibrous tissue which has been comminuted in a food chopper, are mixed together to form the material from which component 2 will be prepared. This material is fed into the final triturating machine, in which it is finely disintegrated into a puree having the properties already described for component 2. Component 1 is treated by any suitable method of removing water to yield juice concentrate of from 30 to 50 percent total solids content, determined on a dry basis. A method such as is presently used commercially in preparing orange juice concentrate for freezing may be used in preparing this concentrate. In this method, usually only a part of the extracted juice is concentrated. A part of the extracted juice, unconcentrated, is used as cut-back juice to give natural flavor to the final product. The remainder of the juice is concentrated by an established procedure. The concentrated juice is mixed with the cut-back juice to give a resultant component 1 having 40-45 percent total solids on dry basis. The cut-back concentrate of component 1 (40-45 percent total solids) is mixed with component 2 in proper proportions to give the desired final solids content of from 32 to 36 percent, dry basis. The mixture is seasoned with salt and/or sugar.

Satisfactory grapefruit concentrate may be formulated by mixing from .2 part to 2 parts by weight of component 2 with one part by weight of cut-back concentrate of component 1 (40-45 percent total solids). Preferred range for this ratio is from .3 to 1.5. The final concentrate, which is a mixture of the cut-back concentrate of component 1, salt and/or sugar if desired, and component 2, is sealed in cans or glass containers and is either deep frozen or processed for sterilization—or else it is "flash" sterilized, then filled into containers, sealed and cooled. For grapefruit concentrate, the preferred range of total solids, dry basis, of component 2 is from 10 to 13 percent; permissible range is from 9 to 16 percent. Reconstitution of grapefruit concentrate, made in the manner which has been described, may be accomplished by adding water to the concentrate in the ratio of from one part to 2.5 parts by weight of water to one part by weight of concentrate. The preferred range for the amount of water to be added is from 1.5 parts to 2.0 parts by weight of water to one part by weight of concentrate.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention. For instance, utilization of the invention in treating asparagus stalks will result in a juice which may be used to advantage in making a cream soup of high quality, either with or without the addition of water to the juice. Therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. The process of preparing a juice product from fruit and vegetable stocks containing tough fibrous tissue and other insoluble solid substance whereby substantial portions of the fibrous tissue and other insoluble solids contained in the stock form components of the final juice product and are caused to remain in suspension therein for a relatively long period of time which comprises disintegrating the stock into pulpy mashed condition, screening the mashed stock through a screen having openings approximately ³⁄₁₆" in size and discarding the portion caught by said screen, expressing a primary juice from the stock that passes said screen through another screen having openings approximately .015" to .060" in size and collecting the said primary juice apart from the fibrous material caught by said last named screen, then shredding the fibrous material caught by said last named screen in concentrated form into individual fiber filaments of approximately .0004 cm. thick and at least .01 cm. long mixed with jelly-like pectinous material of smooth texture produced during the shredding to obtain a puree-like material containing masses of the filamentary fibers and other insoluble solids released during the shredding process which amount to at least 90 percent solids as indicated by centrifuging in the manner described in the "Text of proposed FSA standards for canned pineapple and canned pineapple juice," section 5, paragraph b4, published in the Federal Register, August 6, 1949, Doc. No. FDC 56, and collecting the puree-like material apart from the said primary juice, then mixing a portion of the said primary juice with a portion of the said puree-like material to produce the final juice product.

2. The process of preparing a juice product from vegetative stock containing tough fibrous tissue and other insoluble solids whereby a portion of the fibrous tissue and other insoluble solids contained in the stock form components of the final juice product and are caused to remain in suspension therein for a relatively long period of time which comprises disintegrating the raw material into a pulpy mashed condition capable of passing through a screen having ⅛" to ⅜" holes and expressing a primary juice and other fine insoluble solids from the mashed product in a press having openings .015" to .060" in size and collecting the expressed primary juice containing fine insoluble solids apart from the fibrous portion retained by the press, triturating the fibrous portion of the stock retained by the press in its concentrated form into masses of individual fiber filaments of approximately .0004 cm. thick and at least .01 cm. long permeated with a jelly-like pectinous material produced during the shredding to form a puree-like material containing at least 90 percent of solids as indicated by centrifuging in the manner described in the "Text of proposed FSA standards for canned pineapple and canned pineapple juice," section 5, paragraph b4, published in the Federal Register, August 6, 1949, Doc. No. FDC 56, and collecting the puree-like material apart from the primary juice, then mixing a portion of the primary juice component with a portion of the puree-like material and a seasoning component to produce the final juice product.

3. The process of preparing a juice product from pineapple and other similar stocks containing tough fibrous tissue and other insoluble solids whereby substantial portions of the fibrous tissue and other insoluble solids contained in the stock form components of the final juice and are caused to remain in suspension therein for a relatively long period of time which comprises passing the raw material through a hammer mill having a screen with openings approximately ³⁄₁₆" in size and expressing a primary juice from the primary effluent from the hammer mill with a press having openings .015" to .060" in size to procure a residuum product containing less coarse fibrous material and insoluble solids in concentrated form, discarding the secondary effluent from the hammer mill consisting of coarse fibrous tissue and triturating the said residuum product retained by the press consisting of less coarse fibrous material and insoluble solids in its concentrated form into masses of individual fiber filaments of approximately .0004 cm. thick and at least .01 cm. long permeated with a jelly-like pectinous material produced during the triturating process to form a puree-like material containing at least 90 percent of solids as indicated by centrifuging in the manner described in the "Text of proposed FSA standards for canned pineapple and canned pineapplie juice," section 5, paragraph b4, published in the Federal Register, August 6, 1949, Doc. No. FDC 56, and collecting the puree-like material apart from the said primary juice, then mixing a portion of the said primary juice with the puree-like material to produce the final juice product.

4. The process of preparing a juice product from vegetative stock containing tough fibrous tissue and other insoluble solids whereby fibrous tissue and other insoluble solids contained in the stock form components of the juice product and are caused to remain in suspension therein for a relatively long period of time which comprises disintegrating the raw material into a pulpy mashed state and expressing and collecting a primary juice containing fine insoluble solids from the mashed product and producing a residuum product containing fibrous material, triturating said residuum product containing fibrous material in concentrated form into masses of individual fiber filaments approximately .0004 cm. thick and at least .01 cm. long permeated with a jelly-like pectinous material produced during the triturating process to form a puree-like material containing at least 90 percent of solids as indicated by centrifuging in the manner described in the "Text of proposed FSA standards for canned pineapple and canned pineapple juice," section 5, paragraph b4, published in the Federal Register, August 6, 1949, Doc. No. FDC 56, and collecting the puree-like material apart from the said primary juice, then mixing a portion of the said primary juice component with the puree-like component to produce the final juice product.

5. The process of preparing a juice product from fruit and vegetable stocks containing tough fibrous tissue and other insoluble solid substances whereby fibrous tissue and other insoluble solid portions of the stock form components of the final juice product and are caused to remain in suspension therein for a relatively long period of time which comprises disintegrating the stock into a pulpy mashed product and expressing a primary juice therefrom through a screen having openings .015" to .060" in size and producing thereby a residuum product composed mainly of fibrous material in concentrated form, shredding the concentrated remaining fibrous material in concentrated form into individual fiber filaments of approximately .0004 cm. thick and at least .01 cm. long mixed with jelly-like pectinous material of smooth texture released during the shredding to obtain a puree-like material containing masses of the filamentary fibers and other insoluble solids which amount to at least 90 percent solids as indicated by centrifuging in the manner described in the "Text of proposed FSA standards for canned pineapple and canned pineapple juice," section 5, paragraph b4, published in the Federal Register, August 6, 1949, Doc. No. FDC 56, and collecting the puree-like material apart from the said primary juice with a portion of the puree-like material to produce the final juice product.

6. The process of preparing a juice product from fruit and vegetable stocks containing tough fibrous tissue and other insoluble solid substances whereby fibrous tissue and other insoluble solid portions contained in the stock form components of the final product and are caused to remain in suspension in the juice for a relatively long period of time which comprises disintegrating the stock into a pulpy mashed product and expressing and collecting a primary juice therefrom and producing a residuum product composed mainly of fibrous material in concentrated form, shredding the said residuum product containing fibrous material in its concentrated form into individual filaments of approximately .0004 cm. thick and generally at least .01 cm. long mixed with jelly-like pectinous material of smooth texture produced during the shredding so as to obtain a puree-like material containing masses of entangled filamentary fibers and other insoluble solids which amount to at least 90 percent solids as indicated by centrifuging in the manner described in the "Text of proposed FSA standards for canned pineapple and canned pineapple juice," section 5, paragraph b4, published in the Federal Register, August 6, 1949, Doc. No. FDC 56, and collecting the puree-like material apart from the said primary juice, then mixing a portion of the said primary juice with a portion of the puree-like material to produce the final juice product.

7. The process of preparing a juice product from fruit and vegetable stocks in which substantial portions of the fibrous tissue and other insoluble solids present in the stock form components of the final juice product and are caused to remain in suspension therein for a relatively long period of time without agitation which comprises disintegrating the stock into a pulpy mashed product, expressing and collecting a primary juice from the mashed product and producing a residuum product composed mainly of fibrous material in concentrated form, shredding the said residuum product containing the fibrous material in its concentrated form into masses of attenuated individual fiber filaments permeated with a serum-like pectinous material of smooth texture produced during the shredding to form a puree-like material containing masses of individual filamentary fibers and other insoluble solids released during the shredding which amount to at least 90 percent solids as indicated by centrifuging in the manner described in the "Text of proposed FSA standards for canned pineapple and canned pineapple juice," section 5, paragraph b4, published in the Federal Register, August 6, 1949, Doc. No. FDC 56, and collecting the puree-like material apart from the said primary juice, then mixing a portion of the said primary juice with a portion of the puree-like material and with a seasoning component to produce the final juice product.

8. The process of preparing a juice product from fruit and vegetable stocks containing fibrous tissue and other insoluble solids so that substantial portions of the fibrous tissue and insoluble solids form components of the final juice product and are caused to remain in suspension in the juice product for a relatively long period of time which comprises disintegrating the stock into a pulpy mashed product, expressing and collecting primary juice from the mashed product composed mainly of fibrous material in concentrated form, shredding the concentrated residual fibrous material in its concentrated form into masses of attenuated individual fiber filaments and simultaneously permeating the masses with the jelly-like pectinous material of smooth texture produced during the shredding to form a puree-like material containing masses of filamentary fibers and other insoluble solids which amount to at least 90 percent solids as indicated by centrifuging in the manner described in the "Text of proposed FSA standards for canned pineapple and canned pineapple juice," section 5, paragraph b4, published in the Federal Register, August 6, 1949, Doc. No. FDC 56, and collecting the puree-like material apart from the said primary juice, then mixing a portion of the said primary juice with a portion of the puree-like material to form the final juice product.

9. The process of claim 8 including the step of adding a seasoning component.

10. The process of preparing a juice product from fruit and vegetable stocks containing fibrous tissue and other insoluble solids so that substantial portions of the fibrous tissue and insoluble solids form components of the final juice product and are caused to remain in suspension in the juice product for a relatively long period of time which comprises disintegrating the stock into a pulpy mashed product, expressing and collecting a primary juice from the mashed product and producing a remainder product composed mainly of fibrous material, and forming from the concentrated remaining fibrous material while in its concentrated form and separately from the said expressed primary juice a secondary product of puree-like consistency, said puree-like product containing individual fiber filaments permeated with a serum-like pectinous material and other insoluble solids released during the said separate processing which amount to at least 90 percent solids as indicated by centrifuging in the manner described in the "Text of proposed FSA standards for canned pineapple and canned pineapple juice," section 5, paragraph b4, published in the Federal Register, August 6, 1949, Doc. No. FDC 56, and collecting the puree-like product apart from the said primary juice, then mixing a portion of the said primary juice with a portion of the puree-like product to produce the final juice product.

11. The process of preparing a juice product from fruit and vegetable stocks containing tough fibrous tissue and other insoluble substances in which portions of the fibrous tissue and insoluble solids form components of the final product and are caused to remain in suspension therein for a relatively long period of time which consists in macerating the raw material and separating the macerated product into a primary juice product containing insoluble solids in a fine state of subdivision and a tissue product containing bundles of fibrous tissue and other insoluble solids in concentrated form, then separately triturating the concentrated tissue product in its concentrated form to produce a fluid material of puree-like consistency containing masses of entangled but otherwise separated filamentary fibers permeated with pectinous substance and insoluble solids released during the triturating process which amount to at least 90 percent solids as indicated by centrifuging in the manner described in the "Text of proposed FSA standards for canned pineapple and canned pineapple juice," section 5, paragraph b4, published in the Federal Register, August 6, 1949, Doc. No. FDC 56, then mixing a portion of the said primary juice product with a portion of the puree-like material to produce the final juice product.

12. The process of preparing a juice product from pineapple fruit stock containing fibrous tissue and other insoluble solids so that the final juice product contains from 6 to 18 percent of total solids, measured on a dry basis, with fibrous tissue and other insoluble solids as components which are caused to remain in suspension in the juice product for a relatively long period of time which comprises disintegrating the pineapple stock into a pulpy mashed product, expressing and collecting a primary juice from the mashed product and producing a remainder product composed mainly of fibrous material in concentrated form, shredding the concentrated remaining fibrous material in its concentrated form into masses of attenuated individual fiber filaments and simultaneously permeating the masses with a jelly-like pectinous material of smooth texture produced during the shredding to form a puree-like material containing masses of filamentary fibers and other insoluble solids which amounts to at least 10 percent solids, measured on a dry basis, and collecting the puree-like material apart from the said primary juice, then mixing a portion of the said primary juice with a portion of the puree-like material to form the final juice product containing 6 to 18 percent of total solids.

13. The process of claim 12 including the step of adding a sweetening component.

14. The process of preparing a juice product from fruit and vegetable stocks containing fibrous tissue and other insoluble substances whereby portions of the fibrous tissue and insoluble solids form components of the final product and are caused to remain in suspension therein for a relatively long period of time which consists in macerating the raw material and separating the macerated product into a primary juice product containing insoluble solids in a fine state of subdivision and a concentrated tissue product constituting fibrous tissue and other insoluble solids which amounts to at least 10 percent solids, measured on a dry basis, then mechanically working the tissue product in its concentrated form so as to split the tissue into filaments and simultaneously convert the pectinous material contained in the tissue into a jelly-like form to produce a fluid material of puree-like consistency containing masses of entangled but otherwise separated fibers permeated with the converted pectinous material and insoluble solids released during the said mechanical working, then mixing a portion of the said primary juice product with a portion of the puree-like material to produce the final juice product.

15. The process of treating fruit and vegetable stocks to produce a juice product containing substantial portions of the fibrous tissue and other insoluble solids contained in the stock which consists in macerating the stock into a pulpy mass and extracting therefrom a primary juice containing fine solids and producing a remainder product composed mainly of fibrous tissue in concentrated form, then mechanically working the concentrated remaining fibrous tissue in its concentrated form so as to subdivide the tissue into microscopic attenuated filamentary fibers and coincidently to release therefrom and convert the pectinous material inherent therein into a jelly-like form whereby to produce a puree-like fluid of relatively high buoyancy containing at least 90 percent of solids as indicated by centrifuging in the manner described in the "Text of proposed FSA standards for canned pineapple and canned pineapple juice," section 5, paragraph b4, published in the Federal Register, August 6, 1949, Doc. No. FDC 56, and then mixing a portion of the extracted primary juice with a portion of the puree-like fluid to form the final juice product.

16. The process of claim 15 in which a portion of the primary juice extracted from the pulpy mass is further treated to remove part of its water content so as to yield a juice concentrate of from 30 to 60 percent solids content determined on a dry basis and thereafter adding the juice concentrate to the unconcentrated portion of the primary juice in proportions to form a juice product having 40 to 45 percent total solids content determined on a dry basis.

References Cited in the file of this patent

UNITED STATES PATENTS

| Number | Name | Date |
|---|---|---|
| 1,619,202 | Greenstreet | Mar. 1, 1927 |
| 1,746,657 | Kemp | Feb. 11, 1930 |
| 2,045,856 | Hoyt et al. | June 30, 1936 |
| 2,089,071 | Roberts | Aug. 3, 1937 |
| 2,419,545 | Grey et al. | Apr. 29, 1947 |
| 2,510,679 | Bruce | June 6, 1950 |
| 2,647,059 | Wenzelberger | July 28, 1953 |